United States Patent [19]
Ko et al.

[11] Patent Number: 5,753,778
[45] Date of Patent: May 19, 1998

[54] METHOD FOR SELECTIVELY HYDROGENATING A LIVING POLYMER HAVING OLEFINIC DOUBLE BONDS

[75] Inventors: Young-Hoon Ko; Hoo-Chae Kim; Seung-Duk Cho, all of Taejeon, Rep. of Korea

[73] Assignee: Korea Kumho Petrochemical Co., Ltd., Seoul, Rep. of Korea

[21] Appl. No.: 740,468

[22] Filed: Oct. 29, 1996

[30] Foreign Application Priority Data

Apr. 26, 1996 [KR] Rep. of Korea .................. 96-13227

[51] Int. Cl.$^6$ ........................................... C08F 8/04
[52] U.S. Cl. .................. 525/339; 525/337.8; 525/337.9; 525/333.1; 525/333.2; 525/338
[58] Field of Search ........................ 525/338, 339

[56] References Cited

U.S. PATENT DOCUMENTS

| | | | |
|---|---|---|---|
| 4,501,857 | 2/1985 | Kishimoto | 525/338 |
| 4,673,714 | 6/1987 | Kishimoto | 525/314 |
| 4,980,421 | 12/1990 | Teramoto | 525/338 |
| 5,039,755 | 8/1991 | Chamberlain | 525/338 |

*Primary Examiner*—Bernard Lipman
*Attorney, Agent, or Firm*—Harrison & Egbert

[57] ABSTRACT

There is provided a method for selectively hydrogenating living polymers having olefinic double bonds, in which the living polymers resulting from the polymerization initiated by alkyllithium compound are deactivated by contacting the polymerization terminators for a short time under a mild condition and hydrogenated in the presence of bis (cyclopentadienyl)titanium compound in high efficiency and high reproducibility without adjusting accurate molar ratio of the lithium compound to the titanium compound.

9 Claims, No Drawings

METHOD FOR SELECTIVELY HYDROGENATING A LIVING POLYMER HAVING OLEFINIC DOUBLE BONDS

BACKGROUND OF THE INVENTION

1. Field of the Invention

The present invention relates to a method for selectively hydrogenating a living polymer having olefinic double bonds. More particularly, the present invention is concerned with a method for selectively hydrogenating a living polymer comprising deactivating the living polymer with a reaction terminator, before contacting living polymer having olefinic double bonds with titanium catalysts, which is superior in yield, selectivity and reproducibility.

2. Description of the Prior Art

Polymers with olefinic double bonds are usually used as elastomer. They are utilized as such or as a processed state in vulcanization method and the like. However, such materials have a significant disadvantage in that the polymers are limited in use because the double bonds in polymers have a seriously deleterious influence on the weatherability, heat resistance, resistance to oxidation and ozone resistance thereof.

This problem could be overcome by hydrogenating the double bonds of the polymers. Generally, the hydrogenation of the polymers having olefinic double bonds is carried out in the presence of a heterogeneous or homogeneous catalyst.

A typical heterogeneous catalyst is platinum or palladium supported on carbon, silica, alumina, etc. Besides, a homogeneous catalyst is prepared by mixing an organometal compound of nickel, cobalt, titanium, or the like with a reducing compound such as an organoaluminum, an organomagnesium, an organolithium or the like.

Heterogeneous catalysts are lower in hydrogenation activity over homogeneous catalysts and thus are required higher temperature and pressure during reaction. If reactants are the polymers, the heterogeneous catalysts have serious difficulty in hydrogenating them due to the high viscosity of the reaction system and the steric hinderance of the polymers. Thus, the heterogeneous catalysts are economically unfavorable in that a large quantity of catalysts are required for effective hydrogenation. Also, requirements of high temperature and pressure result in decomposition and gelation of the polymers. The heterogeneous catalysts are not suitable for hydrogenation of the polymers.

In contrast, the homogeneous catalysts are very advantageous by virtue of being obtainable high reactivity and high hydrogenation yield even at a low temperature and a low pressure. However, it is so difficult to obtain reproducibly a product in high yield that the hydrogenation activity does deeply related to the reduction state of the catalyst. Further, the activity of the catalysts is prone to be easily losed by impurities in reactants. Thus, it is difficult to control the hydrogenation yield and reproducibility using the homogeneous catalyst due to such a trace of impurities.

U.S. Pat. No. 4,501,857 discloses that at least one of bis(cyclopentadienyl)titanium compounds and at least one of hydrocarbon lithium compounds are needed for selective hydrogenation of polymers having olefinic double bonds. However, as also mentioned in the patent, as the molar ratio of Li/Ti changes, it is difficult to obtain simultaneously high hydrogenation yield as well as high reproducibility, so that the correct molar ratio must be strictly controlled. Indeed, it is quite difficult to satisfy high hydrogenation yield and high reproducibility simultaneously according to the changes of molecular weight and moles of lithium in the living polymer. Further, the anions of the living polymer may cause to crosslink between the polymers, prior to, and subsequent to proceeding of hydrogenation, resulting in formation of a high molecular polymer. In addition, the anions may modify the reduction state of the catalyst to cause of a factor lowering the catalyst activity.

Similar to the above-cited patent, U.S. Pat. No. 4,980,421 suggests alkoxylithium compounds as a cocatalyst, instead of hydrocarbon lithium compounds. In this patent, such a cocatalyst may be prepared by directly adding an alcohol or phenol compound to the living polymer or it may be a mixture obtained by the reaction of an organolithium compound and an alcohol and phenol compound. It is also mentioned, that hydrogenation utilizing such a catalyst system, is superior in reactivity under mild conditions. However, although there is mentioned that reaction stability can be accomplished by using alcohols and phenols as a cocatalyst, they may deleteriously affect the molecular weight control of the polymer upon continuous processes due to use of alcohols and phenols and residual alcohols and phenols unchanged into alkoxylithium may act as a poison to catalyst activating species.

U.S. Pat. No. 4,673,714 relates to a reaction for selective hydrogenation of polymers having olefinic double bonds using titanium compound in the absence of hydrocarbon lithium as a reducing metal compound. It is described in this patent that the hydrogenation can be easily accomplished by employing only bis(cyclopentadienyl)titanium diaryl compound as a catalyst. It is mentioned that this technique is very effective because it does not need alkyllithium compound as a cocatalyst. But, a separate precise preparation process of the catalyst is necessary prior to hydrogenation. Further, the catalyst separately prepared has a disadvantage to be deactivated by the impurities present in the reactants.

In U.S. Pat. No. 5,039,755, hydrogenation was carried out by adding hydrogen to a living polymer prepared with an alkyllithium initiator, and reacting it under pressure to deactivate the polymer, and then hydrogenating it with a titanium catalyst. The deactivation of the living polymer by use of hydrogen is disadvantageous, in that temperature and pressure conditions are very severe and the reaction time becomes longer because the liquid phase must be efficiently mixed with the gas phase. Further, since the reaction activity of the catalyst varies with the molar ratio of Li/Ti, it is difficult to provide both high reaction activity and high reproducibility for the catalyst.

Therefore, there exists a need for a novel catalyst system, that shows not only high reaction activity and reproducibility, but also is not easily deactivated by even a trace of impurities.

SUMMARY OF THE INVENTION

The present invention is to provide novel method for selectively hydrogenating living polymers having olefinic double bonds in high hydrogenation rate and high reaction reproducibility, by which the living polymers resulting from the polymerization initiated by alkyllithium compounds can be deactivated by contacting the polymerization terminators for a short time under a mild condition and hydrogenated in the presence of bis(cyclopentadienyl)titanium compound, without adjusting an accurate molar ratio of the lithium compound to the titanium compound, and the gelation of high molecular compound resulting from crosslinking within the polymer and the changes of reduction state of catalysts can be avoided due to active anions of the living polymers.

Accordingly, it is an object of the present invention to provide a method for selectively hydrogenating living polymers having olefinic double bonds, comprising the steps of:

polymerizing at least one of monomers having conjugated double bonds or at least one of monomers having conjugated double bonds and olefinic monomers in an appropriate solvent in the presence of an alkyllithium initiator represented by the following general formula I to prepare a living polymer:

RLi  (I)

wherein R is a $C_1$–$C_5$ alkyl group; deactivating the living polymer by using at least one compound selected from the group consisting of toluene, ethyltoluene, trimethylbenzene, phenyltoluene, xylene, diphenylmethane, diphenylethane, dimethylbiphenyl, ethylbiphenyl, diphenylpropane, benzylbiphenyl, triphenylmethane, indene, methylindene, ethylindene, fluorene, methylfluorene and ethylfluorene; and contacting the double bonds present in the conjugated double bond units of the deactivated polymers with hydrogen in the presence of bis(cyclopentadienyl)titanium compound represented by the following general formula II, to selectively hydrogenate the polymer:

wherein $X_1$ and $X_2$ are the same or different, and represent a halogen group.

DETAILED DESCRIPTION OF THE INVENTION

Herein, the term "polymers having olefinic double bonds" refers to all polymers that have intramolecular double bonds. Preferably, polymers having olefinic double bonds include random, block and graft copolymers between compounds with conjugated double bonds (hereinafter referred to as "conjugated diene") and olefinic monomers. Typical conjugated dienes necessary for the preparation of conjugated diene polymer are hydrocarbons containing 4 to 12 carbon atoms, including 1,3-butadiene, isoprene, 2,3-dimethyl-1,3-butadiene, 1,3-pentadiene, 2-methyl-1,3-pentadiene, 1,3-hexadiene and the like.

In order to obtain commercially useful and valuable elastomers and thermoplastic elastomers, copolymers of the conjugated dienes and alkenyl aromatic hydrocarbons are necessary. Examples of the alkenyl aromatic hydrocarbons for preparing such copolymers include styrene, t-butylstyrene, α-methylstyrene and p-methylstyrene, and preferably styrene and α-methylstyrene. The resulting copolymers are exemplified by butadiene/styrene copolymers, isoprene/styrene copolymers, and butadiene/α-methylstyrene copolymer, and each copolymer belongs to a random copolymer, a tapered block copolymer, a block copolymer or a graft copolymer.

5 to 95% by weight of alkenyl aromatic hydrocarbons must be contained in such copolymers in order to produce commercially useful thermoplastic elastomers. The polymer used in the present invention is a block copolymer having a molecular weight of about 1,000 to 1,000,000.

The present invention can be applied for the hydrogenation of all the above mentioned copolymers. Since, as polymerization terminators, toluene, ethyltoluene, trimethylbenzene, phenyltoluene, xylene, diphenylmethane, diphenylethane, dimethylbiphenyl, ethylbiphenyl, diphenylpropane, benzylbiphenyl, triphenylmethane, indene, methylindene, ethylindene, fluorene, methylfluorene and ethylfluorene are used alone or in combination, the anion polymerization can be simply terminated within a short time. Therefore, crosslinking of polymers may be prevented and thus the gelation arising from the crosslinking may be effectively prevented. Conventionally, alcohols have been used as the terminators, but they show the disadvantage of deactivating catalysts upon continuous dehydrogenating processes. In contrast, the terminators of is the present invention have no deleterious influence on the activity of the hydrogenating catalyst.

The solvents for producing the above polymers are available those that do not react with any material participating in the hydrogenation. Appropriate solvents include unsubstituted hydrocarbons, substituted hydrocarbons and cyclohydrocarbons. For example, pentane, hexane, heptane, octane, tetrahydrofuran, cyclopentane, cyclohexane, cycloheptane and the like are mentioned.

The hydrogenation of the copolymer is carried out through the following steps:

(A) polymerizing at least one of conjugated dienes in an appropriate solvent in the presence of an alkyllithium polymerization initiator represented by the following general formula I to prepare a living polymer:

RLi  (I)

wherein R is a $C_1$–$C_5$ alkyl group;

(B) deactivating the living polymer by using at least one compound selected from the group consisting of toluene, ethyltoluene, trimethylbenzene, phenyltoluene, xylene, diphenylmethane, diphenylethane, dimethylbiphenyl, ethylbiphenyl, diphenylpropane, benzylbiphenyl, triphenylmethane, indene, methylindene, ethylindene, fluorene, methylfluorene and ethylfluorene respectively, and (C) contacting the double bonds present in the conjugated diene units of the deactivated polymer in step B with hydrogen in the presence of bis(cyclopentadienyl)titanium compound represented by the following general formula II to selectively hydrogenate the polymer

wherein $X_1$ and $X_2$ are the same or different, and represent a halogen group.

Examples of the alkyllithium compound to be used in step A include methyllithium, propyllithium, isopropyllithium, n-butyllithium, sec-butyllithium, t-butyllithium and pentyllithium, with being commercially useful n-butyllithium and sec-butyllithium.

The compounds to be used in the step B include toluene, ethyltoluene, trimethylbenzene, isopropylbenzene, phenyltoluene, xylene, diphenylmethane, diphenylethane, dimethylbiphenyl, ethylbiphenyl, diphenylpropane, benzylbiphenyl, triphenylmethane, indene, methylindene, ethylindene, fluorene, methylfluorene and ethylfluorene. Of them, toluene, xylene, diphenylmethane, triphenylmethane, indene and fluorene are preferred in terms of commercial availability and effective termination.

The titanium compounds to be used in step C are exemplified by bis (cyclopentadienyl) titanium difluoride, bis (cyclopentadienyl) titanium dichloride, bis (cyclopentadienyl)titanium dibromide, and bis (cyclopentadienyl)titanium diiodide. Most advantageous is bis(cyclopentadienyl)titanium dichloride, in terms of stability in air and handling.

In accordance with the present invention, the molar ratio of the lithium compound to be used in step A to the polymerization terminator to be used in step B is preferably on the order of 1:1 to 1:20 and more preferably 1:1 to 1:5. The molar ratio of the lithium compound in step A to the titanium compound to be used in step C preferably ranges from 2:1 to 10:1 and more preferably from 2:1 to 6:1.

The hydrogenation process is carried out at a temperature of 0° to 150° C. and preferably 40° to 120° C. In this process, the partial pressure of hydrogen preferably ranges from 1 to 50 atm, more preferably from 3 to 40 atm and most preferably from 5 to 20 atm. The catalyst is used preferably in an amount of 0.01 to 20 mmol per 100 g of the polymer employed and most preferably 0.05 to 2 mmol. Between 30 to 360 min, the hydrogenation process is completed. As the solvent, n-heptane, n-pentane, tetrahydrofuran, cyclohexane and hexane may be used.

Better embodiments of the present invention will be explained in detail referring to Examples. However, this invention should not be interpreted to be restricted to the Examples.

SYNTHESIS EXAMPLE I

In a 2 gallon autoclave reactor, 4,500 g of cyclohexane was charged. 9 g of tetrahydrofuran, 112.5 g of styrene monomer and 1.7 g of n-butyllithium were charged into the reactor and then the reaction mixture was subjected to polymerization for 1 hr. Then, 525 g of 1,3-butadiene was added in the reactor to polymerize for 1 hr. Thereafter, 112.5 g of styrene monomer was charged and polymerized for 1 hr, to give a styrene-butadiene-styrene block copolymer with a number average molecular weight of about 40,000 in which styrene bond amounted to 29.5% (block styrene content 29.1%) while the 1,2-vinyl content of butadiene unit amounted to 36.5%. The copolymer contained 2.5 mmol of living lithium per 100 g of the polymer.

SYNTHESIS EXAMPLE II

A styrene-butadiene-styrene living block copolymer with a number average molecular weight of 60,000 was synthesized in the manner similar to that of Synthesis Example I, except that 1.3 g of n-butyllithium was added. In the living polymer, styrene bond content amounted to 28.9% (block styrene content 28.4%) while 1,2-vinyl bond content of butadiene unit amounted to 38.7%. The copolymer contained 1.67 mmol of living lithium per 100 g of the polymer.

SYNTHESIS EXAMPLE III

A styrene-butadiene-styrene living block copolymer with a number average molecular weight of 80,000 was synthesized in the manner similar to that of Synthesis Example I, except that 1.1 g of n-butyllithium was added. In the living polymer, styrene bond content amounted to 29.4% (block styrene content 28.9%) while 1,2-vinyl bond content of butadiene unit amounted to 37.3%. The copolymer contained 1.25 mmol of living lithium per 100 g of the polymer.

SYNTHESIS EXAMPLE IV

In a 2 gallon autoclave reactor, 4,500 g of cyclohexane was charged. 9 g of tetrahydrofuran and 1.1 g of n-butyllithium were injected to the reactor, after which 225 g of styrene monomer and 525 g of 1,3-butadiene monomer both were simultaneously injected to the reactor and the resulting mixture was subjected to polymerization for 1 hr, to give a styrene-butadiene-styrene block copolymer with a number average molecular weight of about 60,000 in which styrene content amounted to 29% while the 1,2-vinyl bond content of butadiene unit amounted to 30.5%. The copolymer contained 1.67 mmol of living lithium per 100 g of the polymer.

SYNTHESIS EXAMPLE V

A styrene-isoprene-styrene living block copolymer with a number average molecular weight of about 60,000 was synthesized in the manner similar to that of Synthesis Example I, except that 1.3 g of n-butyllithium was added and isoprene, instead of 1,3-butadiene, was added. In the living polymer, styrene bond content amounted to 29.8% (block styrene content 28.8%) while 1,2-vinyl bond content of isoprene unit amounted to 38.3%. The copolymer contained 1.67 mmol of living lithium per 100 g of the polymer.

EXAMPLE I

In a 10 liter autoclave completely dried, 2,100 g of 14.3 wt % living polymer solution obtained in Synthesis Example I was poured and then, treated with 50 ml of a cyclohexane solution containing 7.5 mmol of toluene as a reaction terminator for 1 hr. After the treatment by terminator, the living polymer in a distinct orange color became completely colorless. Termination was confirmed by a simple calorimetric examination of the polymer cement. Styryllithium living ends have an absorption maximum at 328 nm and thus have a distinct orange color which turn colorless when the living ends are terminated. This was observed in using a reaction terminator as samples were pulled from the reactor and visually, as well as calorimetrically, examined for color change. Thereafter, a hydrogenation reaction was performed at a hydrogen partial pressure of 10 kg/cm$^2$ for 1 hr in the presence of 1.5 mmol of bis(cyclopentadienyl)titanium dichloride acting as a hydrogenating catalyst. After completion of the reaction, the autoclave was returned to room temperature and atmospheric pressure. The reaction solution was steam-stripped to get white polymer. Its hydrogenation yield was analyzed by H-NMR and the result is given as shown in Table 1 below.

EXAMPLE II

A hydrogenation reaction was carried out in a manner similar to that of Example I, except for using 7.5 mmol of xylene, instead of toluene, as a reaction terminator. The result is given as shown in Table 1 below.

EXAMPLE III

A hydrogenation reaction was carried out in a manner similar to that of Example I, except for using 7.5 mmol of diphenyl methane, instead of toluene, as a reaction terminator. The result is given as shown in Table 1 below.

EXAMPLE IV

A hydrogenation reaction was carried out in a manner similar to that of Example I, except for using 7.5 mmol of triphenyl methane, instead of toluene, as a reaction terminator. The result is given as shown in Table 1 below.

EXAMPLE V

A hydrogenation reaction was carried out in a manner similar to that of Example I, except for using 7.5 mmol of indene, instead of toluene, as a reaction terminator. The result is given as shown in Table 1 below.

EXAMPLE VI

A hydrogenation reaction was carried out in a manner similar to that of Example I, except for using 7.5 mmol of fluorene, instead of toluene, as a reaction terminator. The result is given as shown in Table 1 below.

COMPARATIVE EXAMPLE I

A hydrogenation reaction was carried out in a manner similar to that of Example I, except that no reaction terminator was used. The result is given as shown in Table I below.

COMPARATIVE EXAMPLE II

The procedure of Comparative Example was repeated. The result is given as shown in Table 1 below.

TABLE 1

Hydrogenation of the Living Polymers Treated with Reaction Terminator

| No. of Exmpl | Living Polymer | Rxn. Terminator | Molar Ratio Terminator To Lithium | H Addition Percent | |
|---|---|---|---|---|---|
| | | | | Butadiene | Styrene |
| I | ¹S.E. I | Toluene | 1 | 99.3 | <1 |
| II | ¹S.E. II | Xylene | 1 | 99.2 | <1 |
| III | ¹S.E. I | ²DPM | 1 | 99.3 | <1 |
| IV | ¹S.E. I | ³TPM | 1 | 99.4 | <1 |
| V | ¹S.E. I | Indene | 1 | 99.1 | <1 |
| VI | ¹S.E. I | Fluorene | 1 | 99.2 | <1 |
| I | ¹S.E. I | — | — | 95.0 | <1 |
| C.II | ¹S.E. I | — | — | 93.5 | <1 |

¹obtained in Synthesis Examples
²Diphenyl methane
³Triphenyl methane

As apparent from Table 1, the hydrogen addition percentages of butadiene unit are higher when using the reaction terminators of the present invention than when using no terminator. In addition, the hydrogenation of butadiene is poor in reproducibility when no terminator is used. In contrast, the hydrogenation of butadiene is excellent in reproducibility when the terminator is used in the present invention.

EXAMPLE VII

A hydrogenation reaction was carried out in a manner similar to that of Example I, except that a solution containing 14.3% by weight of the living polymer obtained in Synthesis Example II was used and 50 ml of a cyclohexane solution containing 7 mmol of trimethyl methane as a reaction terminator was added. The result is given as shown in Table 2 below.

EXAMPLE VIII

A hydrogenation reaction was carried out in a manner similar to that of Example I, except that a solution containing 14.3% by weight of the living polymer obtained in Synthesis Example II was used and 50 ml of a cyclohexane solution containing 7 mmol of fluorene as a reaction terminator was added. The result is given as shown in Table 2 below.

EXAMPLE IX

A hydrogen addition reaction was carried out in a manner similar to that of Example I, except that a solution containing 14.3% by weight of the living polymer obtained in Synthesis Example III was used and 50 ml of a cyclohexane solution containing 7 mmol of diphenyl methane as a reaction terminator was added. The result is given as shown in Table 2 below.

EXAMPLE X

A hydrogenation reaction was carried out in a manner similar to that of Example I, except that a solution containing 14.3% by weight of the living polymer obtained in Synthesis Example III was used and 50 ml of a cyclohexane solution containing 7 mmol of triphenyl methane as a reaction terminator was added. The result is given as shown in Table 2 below.

EXAMPLE XI

A hydrogenation reaction was carried out in a manner similar to that of Example I, except that a solution containing 14.3% by weight of the living polymer obtained in Synthesis Example III was used and 50 ml of a cyclohexane solution containing 7 mmol of fluorene as a reaction terminator was added. The result is given as shown in Table 2 below.

COMPARATIVE EXAMPLE III

A hydrogenation reaction was carried out in a manner similar to that of Example I, except that the living polymer obtained in Synthesis Example II was not treated with any reaction terminator. The result is given as shown in Table 2 below.

COMPARATIVE EXAMPLE IV

A hydrogenation reaction was carried out in a manner similar to that of Example I, except that the living polymer obtained in Synthesis Example III was not treated with any reaction terminator. The result is given as shown in Table 2 below.

TABLE 2

Hydrogenation of the Living Polymers Treated with Reaction Terminator

| No. of Exmpl | Living Polymer | Rxn. Terminator | Molar Ratio Terminator To Lithium | H Addition Percent | |
|---|---|---|---|---|---|
| | | | | Butadiene | Styrene |
| VII | ¹S.E. II | ²TPM | 1.4 | 99.3 | <1 |
| VIII | ¹S.E. II | Fluorene | 1.4 | 99.4 | <1 |
| IX | ¹S.E. III | ³DPM | 1.9 | 99.2 | <1 |
| X | ¹S.E. I | ²TPM | 1.9 | 99.4 | <1 |
| XI | ¹S.E. I | Fluorene | 1.9 | 99.3 | <1 |
| C.III | ¹S.E. I | — | — | 96.7 | <1 |
| C.IV | ¹S.E. I | — | — | 93.8 | <1 |

¹obtained in Synthesis Examples
²Triphenyl methane
³Diphenyl methane

It is apparent from Table 2 that the treatment with the reaction terminators enhances the hydrogen addition percentage.

EXAMPLES XII TO XX

Hydrogenation reactions were carried out in a manner similar to that of Example I, except that the living solutions obtained in Synthesis Examples I to V were treated with various amounts of fluorene, as indicated in Table 3 below.

TABLE 3

Hydrogenation of the Living Polymers with Molar Ratio of Li/Ti

| No. of Exmpl | Living Polymer | Fluorene to Lithium | Molar Ratio Lithium to Titanium | H Addition Percent Butadiene | Styrene |
|---|---|---|---|---|---|
| XII | ¹S.E. I | 1.2 | 4.9 | 99.1 | <1 |
| XIII | ¹S.E. I | 2.0 | 4.9 | 99.0 | <1 |
| XIV | ¹S.E. II | 1.2 | 3.3 | 100 | <1 |
| XV | ¹S.E. II | 1.5 | 3.3 | 99.5 | <1 |
| XIV | ¹S.E. II | 2.0 | 3.3 | 99.5 | <1 |
| XVII | ¹S.E. II | 1.5 | 2.4 | 99.5 | <1 |
| XVIII | ¹S.E. III | 2.0 | 2.4 | 99.2 | <1 |
| XIX | ¹S.E. IV | 1.5 | 3.3 | 99.2 | <1 |
| XX | ¹S.E. V | 1.5 | 3.3 | 99.3 | <1 |

¹obtained in Synthesis Examples

EXAMPLES XXI TO XXIV

Hydrogenation reactions were carried out in a manner similar to that of Example I, except that the living polymer solution obtained in Synthesis Example II was treated with fluorene and the molar ratio of lithium/titanium was changed by varying the amount of bis(cyclopentadienyl)titanium dichloride. The results are given as shown in Table 4 below.

COMPARATIVE EXAMPLES V TO VIII

Hydrogenation reactions were carried out in a manner similar to that of Example I, except that the living polymer obtained in Synthesis Example II was not treated with any reaction terminator and the molar ratio of lithium/titanium was changed. The results are given as shown in Table 4 below, illustrating that the hydrogenation without treatment of reaction terminator, is poor relative to those with treatment of the reaction terminator. In addition, the hydrogen addition without treatment of reaction terminator depends sensitively on the molar ratio of lithium/titanium, showing poor reproducibility of hydrogenation.

TABLE 4

Hydrogenation of the Living Polymers with Molar Ratio of Li/Ti

| No. of Exmpl. | Living Polymer | Fluorene to Lithium | Molar Ratio Lithium to Titanium | H Addition Percent Butadiene | Styrene |
|---|---|---|---|---|---|
| XXI | ¹S.E. II | 1.2 | 2.5 | 100 | <1 |
| XXII | ¹S.E. II | 1.2 | 4.0 | 99.6 | <1 |
| XXIII | ¹S.E. II | 1.2 | 5.3 | 99.6 | <1 |
| XXIV | ¹S.E. II | 1.2 | 7.5 | 99.4 | <1 |
| C.V | ¹S.E. II | — | 2.5 | 93.1 | <1 |
| C.VI | ¹S.E. II | — | 4.0 | 96.0 | <1 |
| C.VII | ¹S.E. II | — | 5.3 | 94.5 | <1 |
| C.VIII | ¹S.E. II | — | 6.0 | 93.1 | <1 |

¹obtained in Synthesis Example

EXAMPLES XXV TO XXVI

The procedure of Example I was repeated many times after the living polymers obtained in Synthesis Examples I and II were treated with fluorene. The results are given as shown in Table 5 below. The use of the polymerization reaction terminators of the invention accomplishes high hydrogenation percentage and high reproducibility at once.

TABLE 5

Reproducibility Test of Hydrogenation of the Living Polymers Treated with Fluorene

| No. of Exmpl | Living Polymer | Rxn. Terminator | H Addition Percent of butadiene | | | | | average |
|---|---|---|---|---|---|---|---|---|
| | | | 1 | 2 | 3 | 4 | 5 | |
| XXV | ¹S.E. I | Fluorene | 99.1 | 99.3 | 99.4 | 99.5 | 99.3 | 99.3 |
| XXVI | ¹S.E. II | Fluorene | 99.4 | 99.3 | 99.4 | 99.5 | 99.5 | 99.4 |

¹obtained in Synthesis Examples

EXAMPLE XXVII

The procedure of Example I was repeated after the living polymer solution obtained in Synthesis Example I was treated with 7.5 mmol of equimolar indene/fluorene mixture to terminate the polymerization reaction. The hydrogenation percentage of butadiene unit was found to be 99.5% with the hydrogen addition percentage of styrene unit less than 1%.

Other features, advantages and embodiments of the present invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for selectively hydrogenating living polymers having olefinic double bonds comprising the steps of:

polymerizing at least one of monomers having conjugated double bonds or at least one of monomers having conjugated double bonds and olefinic monomers in an appropriate solvent in a presence of an alkyllithium initiator represented by general formula I to prepare a living polymer:

$$RLi \qquad (I)$$

wherein R is a $C_1$–$C_5$ alkyl group;

deactivating the living polymer by using at least one compound selected from the group consisting of toluene, ethyltoluene, trimethylbenzene, phenyltoluene, xylene, diphenylmethane, diphenylethane, dimethylbiphenyl, ethylbiphenyl, diphenylpropane, benzylbiphenyl, triphenylmethane, indene, methylindene, ethylindene, fluorene, methylfluorene and ethylfluorene;

contacting the double bonds present in the conjugated double bond units of the deactivated polymers with hydrogen in a presence of bis(cyclopentadienyl) titanium compound represented by general formula II to selectively hydrogenate the polymer:

wherein $X_1$ and $X_2$ are the same or different, and represent a halogen group.

2. The method in accordance with claim 1, wherein said compound having conjugated double bonds, is selected from 1,3-butadiene and isoprene and said olefinic monomer is selected from styrene and α-methylstyrene.

3. The method in accordance with claim 1, wherein said living polymer is random-, block-, tapered block- or graft copolymer of said monomer having conjugated double bonds and said olefinic monomer.

4. The method in accordance with claim 1, wherein said alkyllithium is n-butyllithium or sec-butyllithium.

5. The method in accordance with claim 1, wherein said bis (cyclopentadienyl) titanium compound is bis (cyclopentadienyl) titanium chloride.

6. The method in accordance with claim 1, wherein said alkyllithium initiator and said at least one compound are used in a molar ratio of 1:1 to 1:5.

7. The method in accordance with claim 1, wherein said initiator and said bis(cyclopentadienyl)titanium compound are used in a molar ratio of 2:1 to 6:1.

8. The method in accordance with claim 1, wherein the hydrogenation is carried out at a temperature of 0° to 150° C. for 30 to 360 min under a hydrogen partial pressure of 1 to 50 atm in the presence of a catalyst existing in an amount of 0.01 to 20 mmol based on 100 g of said polymer.

9. The method in accordance with claim 8, wherein the hydrogenation is carried out at a temperature of 40° to 120° C. under a hydrogen partial pressure of 5 to 20 atm in the presence of a catalyst existing in an amount of 0.05 to 2 mmol based on 100 g of said polymer.

* * * * *